(12) United States Patent
Bachu et al.

(10) Patent No.: US 9,392,621 B2
(45) Date of Patent: Jul. 12, 2016

(54) INITIATING A RANDOM ACCESS PROCEDURE FOR DETERMINING COMMUNICATION PARAMETERS

(75) Inventors: Raja Sekhar Bachu, Somerset, NJ (US); Aamod Dinkar Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 12/821,068

(22) Filed: Jun. 22, 2010

(65) Prior Publication Data

US 2011/0149885 A1   Jun. 23, 2011

Related U.S. Application Data

(60) Provisional application No. 61/220,990, filed on Jun. 26, 2009.

(51) Int. Cl.
*H04W 74/00* (2009.01)
*H04W 74/08* (2009.01)
*H04W 64/00* (2009.01)

(52) U.S. Cl.
CPC ............ *H04W 74/008* (2013.01); *H04W 64/00* (2013.01); *H04W 74/0833* (2013.01)

(58) Field of Classification Search
CPC ............ H04W 64/00; H04W 74/0833; H04W 74/008
USPC ........................................................ 370/242
See application file for complete search history.

(56) References Cited

U.S. PATENT DOCUMENTS

| 2002/0191554 | A1 | 12/2002 | Kondo |
| 2004/0147274 | A1* | 7/2004 | Khawand et al. ............. 455/522 |
| 2007/0047493 | A1* | 3/2007 | Park et al. ..................... 370/331 |
| 2007/0171889 | A1 | 7/2007 | Kwon et al. |
| 2008/0233941 | A1* | 9/2008 | Jen ................................ 455/418 |

(Continued)

FOREIGN PATENT DOCUMENTS

| CN | 101272562 A | 9/2008 |
| CN | 101296514 A | 10/2008 |

(Continued)

OTHER PUBLICATIONS

International Search Report and Written Opinion—PCT/US2010/040092, International Search Authority—European Patent Office—Dec. 28, 2010.

(Continued)

*Primary Examiner* — Jianye Wu
(74) *Attorney, Agent, or Firm* — Ashish L. Patel

(57) ABSTRACT

Systems and methodologies are described that facilitate commanding a wireless device to transmit a random access channel (RACH) signal to measure communication parameters related thereto. The wireless device can transmit a RACH preamble upon receiving a command, and one or more parameters can be computed based at least in part on transmitting the command and/or receiving the RACH preamble, such as a round trip time, a received signal power, and/or the like. The one or more parameters can be communicated to the wireless device in a RACH response signal, and can be utilized by the wireless device. The wireless device can utilize the one or more parameters to estimate a distance for position determination, compute a path loss, and/or the like.

46 Claims, 14 Drawing Sheets

(56) References Cited

U.S. PATENT DOCUMENTS

| | | | |
|---|---|---|---|
| 2008/0268859 A1* | 10/2008 | Lee et al. | 455/450 |
| 2009/0191875 A1* | 7/2009 | Vujcic et al. | 455/436 |
| 2010/0159970 A1* | 6/2010 | Hagerman et al. | 455/500 |
| 2010/0178940 A1* | 7/2010 | Mcaleenan et al. | 455/456.5 |
| 2010/0195636 A1 | 8/2010 | Nakashima et al. | |
| 2010/0296467 A1* | 11/2010 | Pelletier et al. | 370/329 |

FOREIGN PATENT DOCUMENTS

| | | |
|---|---|---|
| EP | 0933961 A2 | 8/1999 |
| JP | 06500902 A | 1/1994 |
| JP | 2003078947 A | 3/2003 |
| JP | 2010512103 A | 4/2010 |
| KR | 20070077022 A | 7/2007 |
| WO | WO9205672 A1 | 4/1992 |
| WO | WO0250563 A1 | 6/2002 |
| WO | 2008069712 A1 | 6/2008 |
| WO | 2008156393 A1 | 12/2008 |
| WO | 2009038074 A1 | 3/2009 |
| WO | WO2009057932 A2 | 5/2009 |

OTHER PUBLICATIONS

Catt, "Introduction of TA+AOA position method in stage 2 spec", 3GPP TSG-RAN WG2 Meeting #66bis, R2-093765, pp. 1-6, Mar. 29, 2009.

Catt, "User Plane scheme for TA+AOA method", 3GPP TSG-RAN WG2 Meeting #67, R2-094519, pp. 1-6, Aug. 24-28, 2009.

Taiwan Search Report—TW099120918—TIPO—Mar. 17, 2014.

* cited by examiner

INITIATING A RANDOM ACCESS PROCEDURE FOR DETERMINING COMMUNICATION PARAMETERS

CROSS-REFERENCE

This application claims the benefit of U.S. Provisional Application Ser. No. 61/220,990, filed Jun. 26, 2009, and entitled "RTT BASED E-CID IN LTE," the entirety of which is incorporated herein by reference.

BACKGROUND

I. Field

The present disclosure relates generally to wireless communications and more specifically to determining communication parameters related to a wireless device.

II. Background

Wireless communication systems are widely, deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

SUMMARY

The following presents a simplified summary Of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating requesting initiation of a random access procedure to measure communication parameters related to a wireless device. For example, a wireless device can perform a random access procedure with an access point to establish communications therewith. The access point can subsequently request another random access procedure from wireless device. The wireless device can initiate another random access procedure, and the access point can determine one or more parameters from the random access procedure (e.g., a round trip time (RTT) related to receiving a signal from the wireless device following requesting the random access procedure, received signal power, and/or the like). Moreover, in an example, the access point can provide the one or more parameters to the wireless device, and the wireless device can utilize the parameters in one or more computations.

According to an aspect, a method of wireless communication is provided that includes receiving a command from an access point to transmit a RACH signal and transmitting the RACH signal to the access point based at least in part on the command.

Another aspect relates to a wireless communications apparatus. The wireless communications apparatus can include at least one processor configured to obtain a command from an access point to transmit over a RACH related to the access point. The at least one processor is further configured to communicate a RACH signal to the access point over the RACH. The wireless communications apparatus also comprises a memory coupled to the at least one processor.

Yet another aspect relates to an apparatus. The apparatus includes means for receiving a command from an access point to transmit a RACH signal. The apparatus also includes means for transmitting the RACH signal to the access point based at least in part on the command.

Still another aspect relates to a computer program product, which can have a computer-readable medium including code for causing at least one computer to obtain a command from an access point to transmit over a RACH related to the access point. The computer-readable medium can also comprise code for causing the at least one computer to communicate a RACH signal to the access point over the RACH.

Moreover, an additional aspect relates to an apparatus including a RACH request receiving component that obtains a command from an access point to transmit a RACH signal. The apparatus further includes a RACH initiating component that transmits the RACH signal to the access point based at least in part on the command to initiate a RACH procedure.

According to another aspect, a method of wireless communication is provided that includes requesting an initiation of a RACH procedure from a wireless device and receiving a RACH signal from the wireless device. The method further includes determining one or more communication parameters based at least in part on the RACH signal.

Another aspect relates to a wireless communications apparatus. The wireless communications apparatus can include at least one processor configured to communicate a request to initiate a RACH procedure to a wireless device and obtain a RACH signal from the wireless device. The at least one processor is further configured to compute one or more communication parameters based at least in part on the RACH signal. The wireless communications apparatus also comprises a memory coupled to the at least one processor.

Yet another aspect relates to an apparatus. The apparatus includes means for requesting an initiation of a RACH procedure from a wireless device and means for receiving a RACH signal from the wireless device. The apparatus also includes means for determining one or more communication parameters based at least in part on the RACH signal.

Still another aspect relates to a computer program product, which can have a computer-readable medium including code for causing at least one computer to communicate a request to initiate a RACH procedure to a wireless device and code for causing the at least one computer to obtain a RACH signal from the wireless device. The computer-readable medium can also comprise code for causing the at least one computer to compute one or more communication parameters based at least in part on the RACH signal.

Moreover, an additional aspect relates to an apparatus including a RACH requesting component that commands a wireless device to initiate a RACH procedure and a RACH preamble receiving component that obtains a RACH signal from the wireless device. The apparatus further includes a parameter generating component that computes one or more communication parameters based at least in part on the RACH signal.

To the accomplishment of the foregoing and related ends, the one or more embodiments comprise the features hereinafter fully described and particularly pointed out in the claims: The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Figure 1:
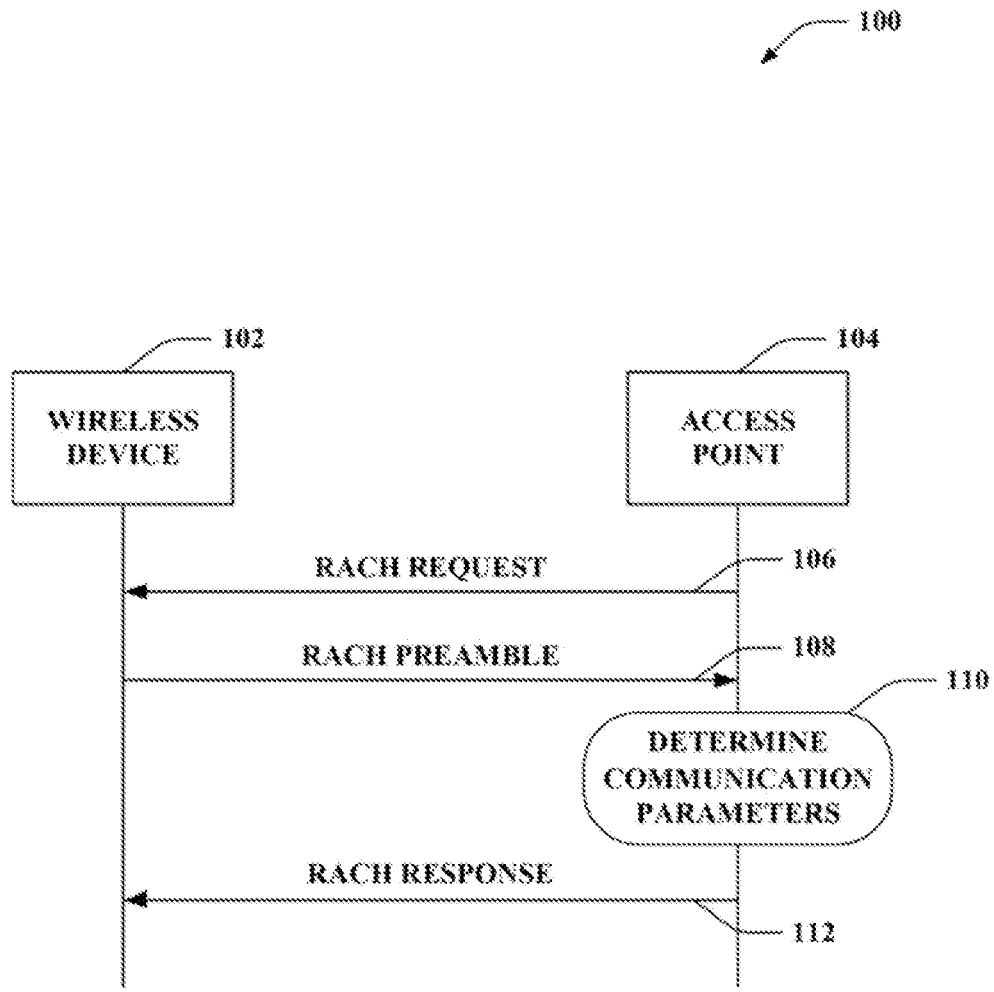
FIG. 1 is a block diagram of a system for commanding a wireless device to transmit a random access channel (RACH) signal.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a wireless device, a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB) or other Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi). IEEE 802.16 (WiMAX), IEEE 802.20, Flash-OFDM®, etc. UTRA and E-UTRA are part of Universal Mobile Telecommunication System (UMTS). 3GPP Long Term Evolution (LIE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an example system 100 that facilitates requesting a random access procedure with a wireless device to determine communication parameters related thereto. System 100 includes a wireless device 102 that receives access to a core network (not shown) from an access point. Access point 104 can be substantially any device that provides wireless network access, such as a macrocell access point, femtocell or picocell access point, eNB, mobile base station, relay node, a portion thereof, and/or the like. Wireless device 102 can be substantially any device that receives wireless network access, such as a mobile device, UE, modem (or other tethered device), a portion thereof, etc.

According to an example, though not depicted, wireless device 102 can perform a random access channel (RACH) procedure (e.g., as defined in 3GPP LTE) to connect with access point 104, including transmitting a RACH preamble (e.g., message 1), receiving a RACH response (e.g., message 2), which can include a timing advance (TA) for wireless device 102, scheduled transmission (e.g., message 3), contention resolution (e.g., message 4), etc. In addition, a RACH procedure can also be referred to as a physical RACH (PRACH) procedure. Once wireless device 102 has connected to access point 104 to receive access to a wireless network, access point 104 can transmit a RACH request 106 signal to wireless device 102 instructing wireless device 102 to initiate another RACH procedure with access point 104. In one example, the RACH request 106 signal can be a contention-free RACH request signal where access point 104 can specify a RACH preamble for wireless device 102 to utilize in the RACH request 106 signal to mitigate interference with other wireless devices performing RACH procedures.

In addition, for example, wireless device 102 can signal a RACH preamble 108 to access point 104 based at least in part on receiving the RACH request 106 signal. This can be similar to a message 1 RACH preamble, as defined in 3GPP LTE. In an example, the RACH preamble 108 can be that specified in the RACH request 106 signal, where it is a contention-free RACH request signal, it can also be a similar RACH preamble, and/or the like. Upon receiving the RACH preamble 108, access point 104 can determine communication parameters 110 based at least in part on the RACH preamble 108. In one example, determining communication parameters 110 can include measuring a round trip time (RTT) between transmitting the RACH request 106 signal and receiving the RACH preamble 108, measuring a received signal power of the RACH preamble 108, and/or the like.

Access point 104 can transmit a RACH response 112 to wireless device 102. In an example, the RACH response 112 can be similar to a message 2 RACH response defined in 3GPP LTE. In one example, the RACH response 112 can include one or more determined communication parameters, such as the RTT, received signal power, and/or the like. In this example, wireless device 102 can utilize the one or more communication parameters (e.g. to estimate a distance of the access point 104 for position determination, to compute a path loss based at least in part on the received signal power at access point 104, and/or the like).

Figure 2:
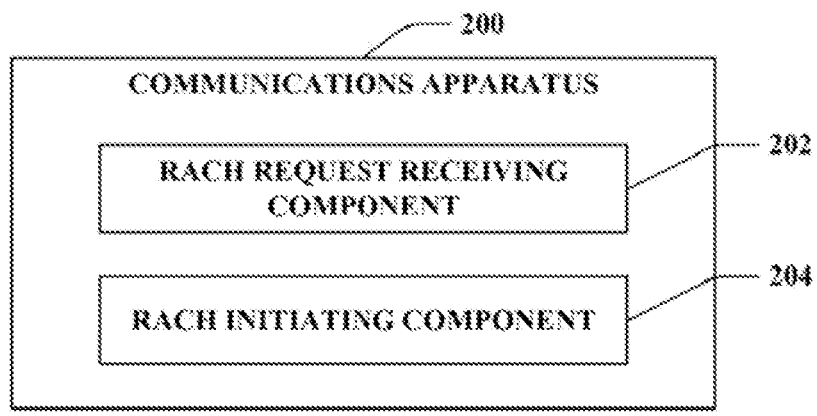
FIG. 2 is an illustration of an example communications apparatus for employment within a wireless communications environment.

Referring next to FIG. 2, a communications apparatus 200 that can participate in a wireless communications network is illustrated. The communications apparatus 200 can be a wireless terminal, an access point, a portion thereof, or substantially any device that receives access to a wireless network. The communications apparatus 200 can include a RACH request receiving component 202 that obtains a request signal from an access point for initiating a RACH procedure and a RACH initiating component 204 that transmits a RACH preamble to the access point as part of the RACH procedure.

According to an example, communications apparatus 200 can establish communications with an access point (not shown) for accessing a wireless network. In an example, RACH request receiving component 202 can obtain a command or request signal (or other instruction) to initiate a RACH procedure with the access point (or a disparate access point). For example, RACH request receiving component 202 can obtain the request signal from the access point. RACH initiating component 204 can transmit a RACH preamble to the access point (or disparate access point) in response to the request. Moreover, in an example, the request can relate to transmitting a contention-free RACH, and can thus specify a RACH preamble to utilize in initiating the RACH procedure. In this example, RACH initiating component 204 can transmit the specified RACH preamble to initiate the RACH procedure. Otherwise, in an example, RACH initiating component 204 can select a RACH preamble related to the access point, select a previous RACH preamble used to establish connection with the access point, and/or the like, based on receiving the command or request signal.

As described, for example, initiating the RACH procedure can assist in determining one or more communication parameters, which can be subsequently provided to communications apparatus 200. For example, the one or more communication parameters can relate to a round trip time of initiating the RACH procedure from the RACH request, a received signal power of the RACH preamble, and/or the like. Communications apparatus 200 can utilize the one or more communication parameters to compute additional parameters, as described herein.

Figure 3:
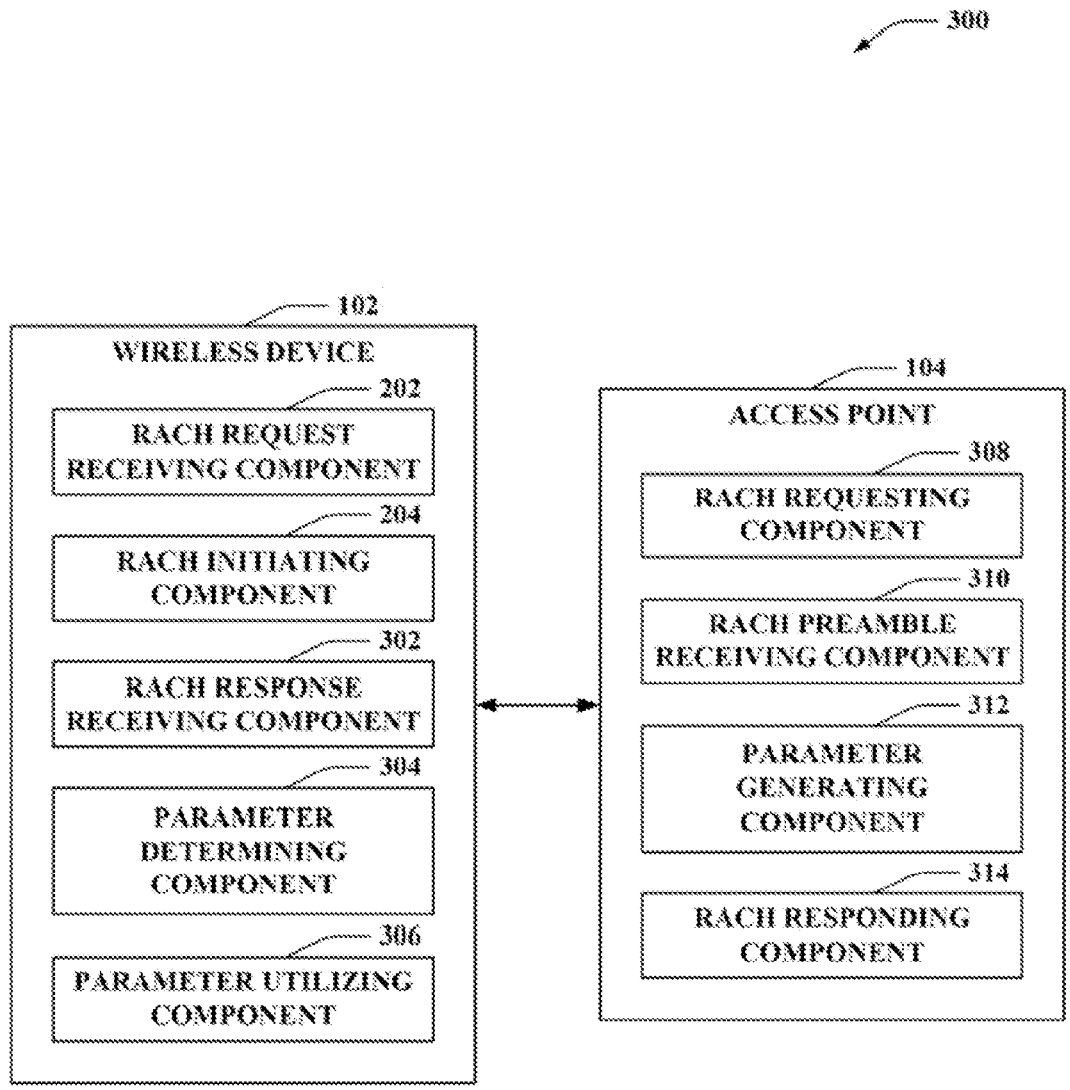
FIG. 3 illustrates an example wireless communication system for providing communication parameters to a wireless device in a RACH procedure.

Now referring to FIG. 3, illustrated is a wireless communications system 300 that facilitates determining communication parameters for wireless devices by instructing to initiate a RACH procedure. System 300 includes an access point 104 that provides one or more wireless devices, such as wireless device 102, with access to a core network (not shown). Access point 104 can be substantially any device that provides wireless network access, such as a macrocell access point, femtocell or picocell access point, eNB, mobile base station, relay node, a portion thereof, and/or the like. Wireless device 102 can be substantially any device that receives wireless network access, such as a mobile device, UE, modem (or other tethered device), a portion thereof, etc., as described.

Wireless device 102 can comprise a RACH request receiving component 202 that obtains a request signal from an access point to initiate a RACH procedure therewith, a RACH initiating component 204 that transmits a RACH preamble to the access point to initiate the RACH procedure, and a RACH response receiving component 302 that obtains a RACH response signal from the access point responding to the RACH preamble. Wireless device 102 additionally includes a parameter determining component 304 that receives one or more communication parameters based at least in part on the RACH response signal from the access point and a parameter utilizing component 306 that processes the one or more communication parameters to determine additional information.

Access point 104 comprises a RACH requesting component 308 that generates and transmits a request for initiating a RACH procedure to a wireless device and a RACH preamble receiving component 310 that obtains a RACH preamble from the wireless device based on the request for RACH procedure. In addition, access point 104 can include a parameter generating component 312 that can compute one or more communication parameters related to obtaining the RACH preamble and a RACH responding component 314 that can transmit a RACH response signal to the wireless device (e.g., including the one or more communication parameters or otherwise).

According to an example, wireless device 102 can connect to access point 104 (e.g., via RACH procedure, as described) to communicate with a wireless network. Once connected, RACH requesting component 308 can generate a RACH request signal for transmitting to the wireless device 102 to measure one or more communication parameters. In one example, the RACH request signal can relate to providing a RACH preamble to a disparate access point (not shown), which can include similar components as access point 104 to process the RACH preamble. RACH requesting component 308 can transmit the RACH request signal to wireless device 102. RACH request receiving component 202 can obtain the RACH request signal, as described, and RACH initiating component 204 can generate a RACH preamble (e.g., randomly, based on a previously utilized RACH preamble, etc.) for transmitting to access point 104 (or a disparate access point) in response to the RACH request signal. Moreover, in an example, the RACH request signal can relate to requesting a contention-free RACH procedure, and can thus include a RACH preamble to be transmitted by wireless device 102.

RACH initiating component 204 can transmit the RACH preamble, whether generated or received, to access point 104 (or a disparate access point). RACH preamble receiving component 310 can obtain the RACH preamble from wireless device 102. Based at least in part on receiving the RACH preamble, RACH responding component 314 can generate a RACH response signal and can transmit the RACH response signal to wireless device 102. Moreover, for example, parameter generating component 312 can determine one or more communication parameters related to the RACH preamble. In one example, parameter generating component 312 can compute an RTT based at least in part on a transmission time at which RACH requesting component 308 transmits the RACH request signal to the wireless device 102 and a time at which RACH preamble receiving component 310 obtains the corresponding RACH preamble from wireless device 102. In another example, parameter generating component 312 can determine or compute a received signal power related to receiving the RACH preamble from wireless device 102. In either case, RACH responding component 314 can include the one or more communication parameters in the RACH response signal.

In addition, for example, RACH response receiving component 302 can obtain the RACH response signal from access point 104. Parameter determining component 304 can retrieve the one or more communication parameters from the RACH response signal, where present, and parameter utilizing component 306 can process the one or more communication parameters (e.g., to determine additional information regarding communicating with access point 104). For example, where parameter determining component 304 receives an RTT from the RACH response signal, parameter utilizing component 306 can estimate a distance of access point 104 based at least in part on the RTT (e.g., for determining a position of wireless device 102). In another example, where parameter determining component 304 obtains a received signal power as one or more communication parameters in the RACH response signal, parameter utilizing component 306 can determine a path loss related to access point 104 (e.g., by associating the received signal power with a signal power related to transmitting the RACH preamble).

In yet another example, parameter generating component 312 can compute a TA related to wireless device 102, which can be based at least in part on the RTT (e.g., one half of the RTT) or otherwise. In this regard, RACH responding component 314 can additionally include the TA in the RACH response signal to make the RACH response signal similar to a message 2, as defined in a 3GPP LTE RACH procedure. RACH response receiving component 302 can obtain the RACH response signal, and parameter determining component 304 can extract the TA. Parameter utilizing component 306 can set a TA of the wireless device 102 to the received TA value in an attempt to synchronize wireless device 102 with access point 104. It is to be appreciated that where parameter generating component 312 also computes a RTT in the RACH response signal, the RTT can be different from the TA and can be figured independently thereof, in one example.

Moreover, it is to be appreciated that RACH responding component 314 can additionally or alternatively cause a disparate access point to communicate the RACH response signal to wireless device 102. In one example, RACH responding component 314 can provide the RACH response signals and/or one or more parameters related thereto to the disparate access point (e.g., over a wired or wireless backhaul link thereto, via one or more components of a wireless network, and/or the like). In this example, the disparate access point can transmit the RACH response signal to wireless device 102 and/or can generate the RACH response signal based on received parameters. In either case, RACH response receiving component 302 can similarly obtain the RACH response signal from the disparate access point.

Figure 4:
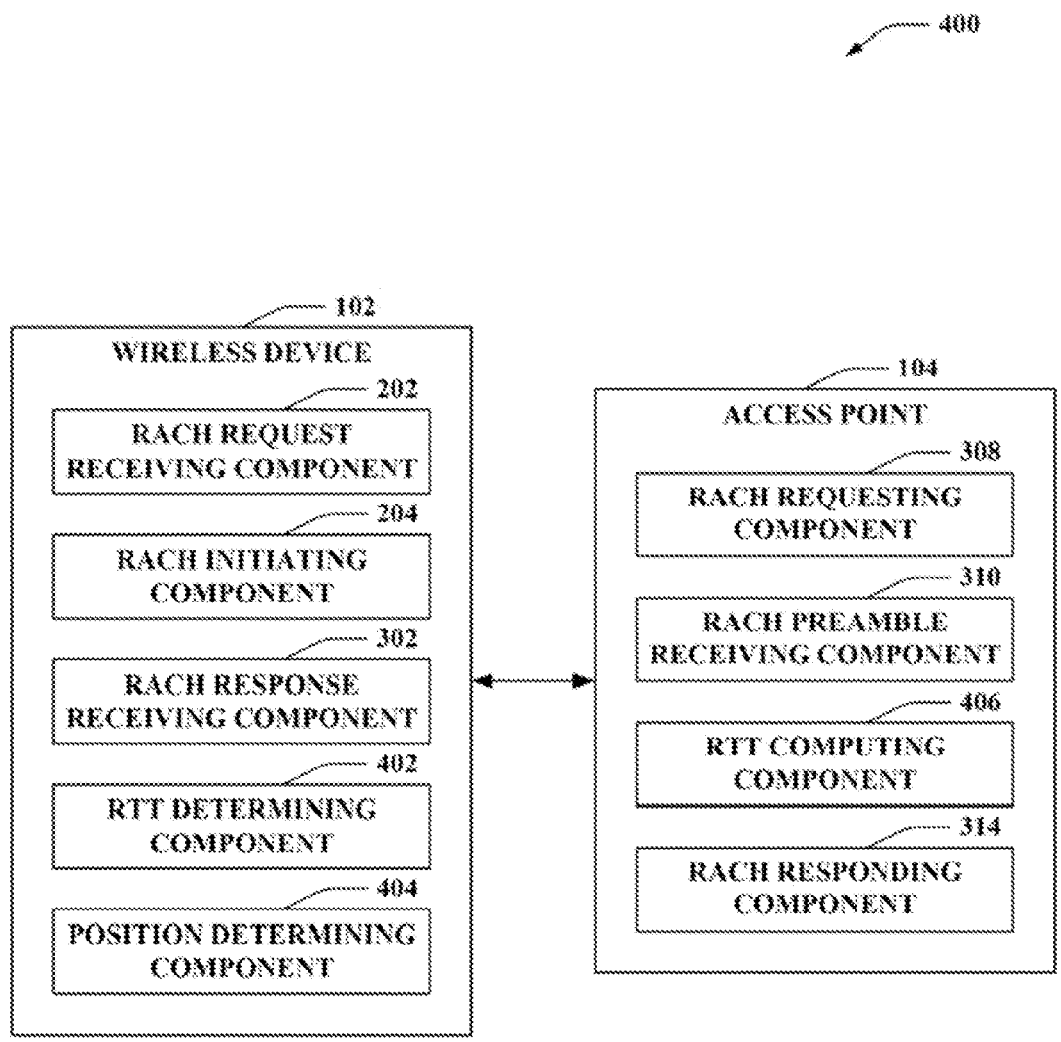
FIG. 4 illustrates an example wireless communication system for determining positioning based on a round trip time (RTT) received during a RACH procedure.

Turning to FIG. 4, illustrated is a wireless communications system 400 that facilitates determining a position of a wireless device based at least in part on receiving RTT during RACH procedures. System 400 includes an access point 104 that provides one or more wireless devices, such as wireless device 102, with access to a core network (not shown). Access point 104 can be substantially any device that provides wireless network access, such as a macrocell access point, femtocell or picocell access point, eNB, mobile base station, relay node, a portion thereof, and/or the like. Wireless device 102 can be substantially any device that receives wireless network access, such as a mobile device, UE, modem (or other tethered device), a portion thereof, etc., as described.

Wireless device 102 can comprise a RACH request receiving component 202 that obtains a request signal from an access point to initiate a RACH procedure therewith, a RACH initiating component 204 that transmits a RACH preamble to the access point to initiate the RACH procedure, and a RACH response receiving component 302 that obtains a RACH response signal from the access point responding to the RACH preamble. Wireless device 102 additionally includes an RTT determining component 402 that extracts an RTT from a received RACH response signal and a position determining component 404 that estimates a position of the wireless device 102 based at least in part on the RTT.

Access point 104 comprises a RACH requesting component 308 that generates and transmits a request for initiating a RACH procedure to a wireless device and a RACH preamble receiving component 310 that obtains a RACH preamble from the wireless device based on the request for RACH procedure. In addition, access point 104 can include a RTT computing component 406 that determines a RTT related to receiving a RACH preamble and a RACH responding component 314 that can transmit a RACH response signal to the wireless device that includes the RTT.

According to an example, wireless device 102 can connect to access point 104 (e.g., via RACH procedure, as described) to communicate with a wireless network. Furthermore, RACH requesting component 308 can generate a RACH request signal for transmitting to the wireless device 102 while connected to measure one or more communication parameters. RACH requesting component 308 can transmit the RACH request signal to wireless device 102. RACH request receiving component 202 can obtain the RACH request signal, as described, and RACH initiating component 204 can determine a RACH preamble (e.g., randomly, based on a previously utilized RACH preamble, etc.) for transmitting to access point 104 in response to the RACH request signal. Moreover, in an example, the RACH request signal can specify a contention-free RACK preamble to be transmitted by wireless device 102.

RACH initiating component 204 can transmit the RACH preamble, whether generated or received in the RACK request signal, to access point 104. RACH preamble receiving component 310 can obtain the RACH preamble from wireless device 102. RTT computing component 406 can compute a RTT related to wireless device 102 based at least in part on a difference between a time at which RACH requesting component 308 transmitted the RACH request signal and a time at which RACH preamble receiving component 310 received the RACH preamble. In another example, the latter time can relate to a time specified in the RACH preamble related to when the RACH preamble is transmitted from wireless device 102.

In either case, RACH responding component 314 can create a RACH response signal that includes the RTT, as described, and can transmit the RACH response signal to wireless device 102. RACH response receiving component 302 can obtain the RACH response signal, and RTT determining component 402 can extract the RTT from the RACH response signal. Based at least in part on the RTT, position determining component 404 can estimate a distance to access point 104. Moreover, for example, position determining component 404 can estimate a position of wireless device 102 based at least in part on the estimated distance (e.g., and one or more reference coordinates related to a location of the access point 104). Furthermore, it is to be appreciated that position determining component 404 can utilize similar estimated distances to other access points to compute a position of wireless device 102 using enhanced cell identifier (E-CID), triangulation, and/or similar position determination, in an example.

Referring now to FIGS. 5-8, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 5:
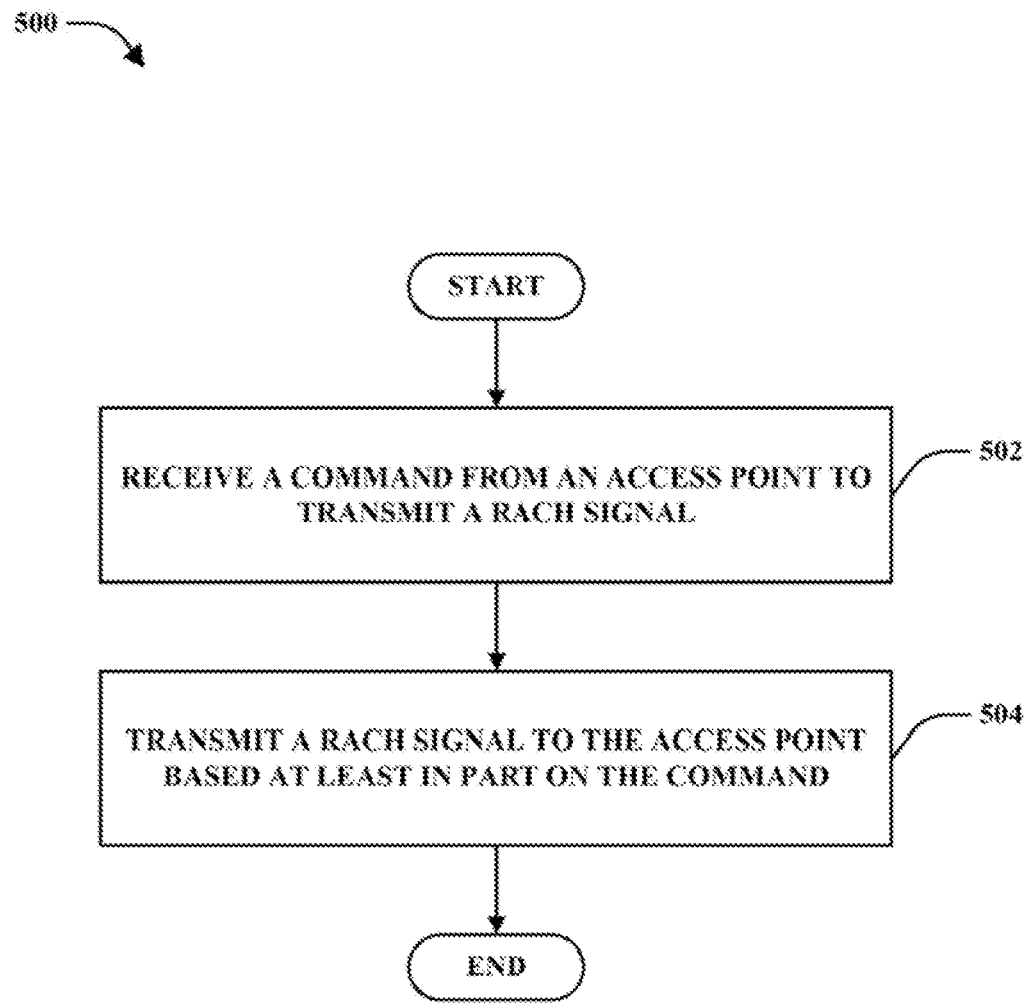
FIG. 5 is a flow diagram of an example methodology that initiates a RACH procedure based on receiving a command.

Turning now to FIG. 5, an example methodology 500 is shown that facilitates transmitting a RACH signal according to a received command. At 502, a command to transmit a RACH signal can be received from an access point. As described, this command can include a contention-free RACH preamble to transmit, in one example. At 504, a RACH signal can be transmitted to the access point based at least in part on the command. As described, where the command includes the contention-free RACH preamble, this RACH preamble can be included in the RACH signal.

Figure 6:
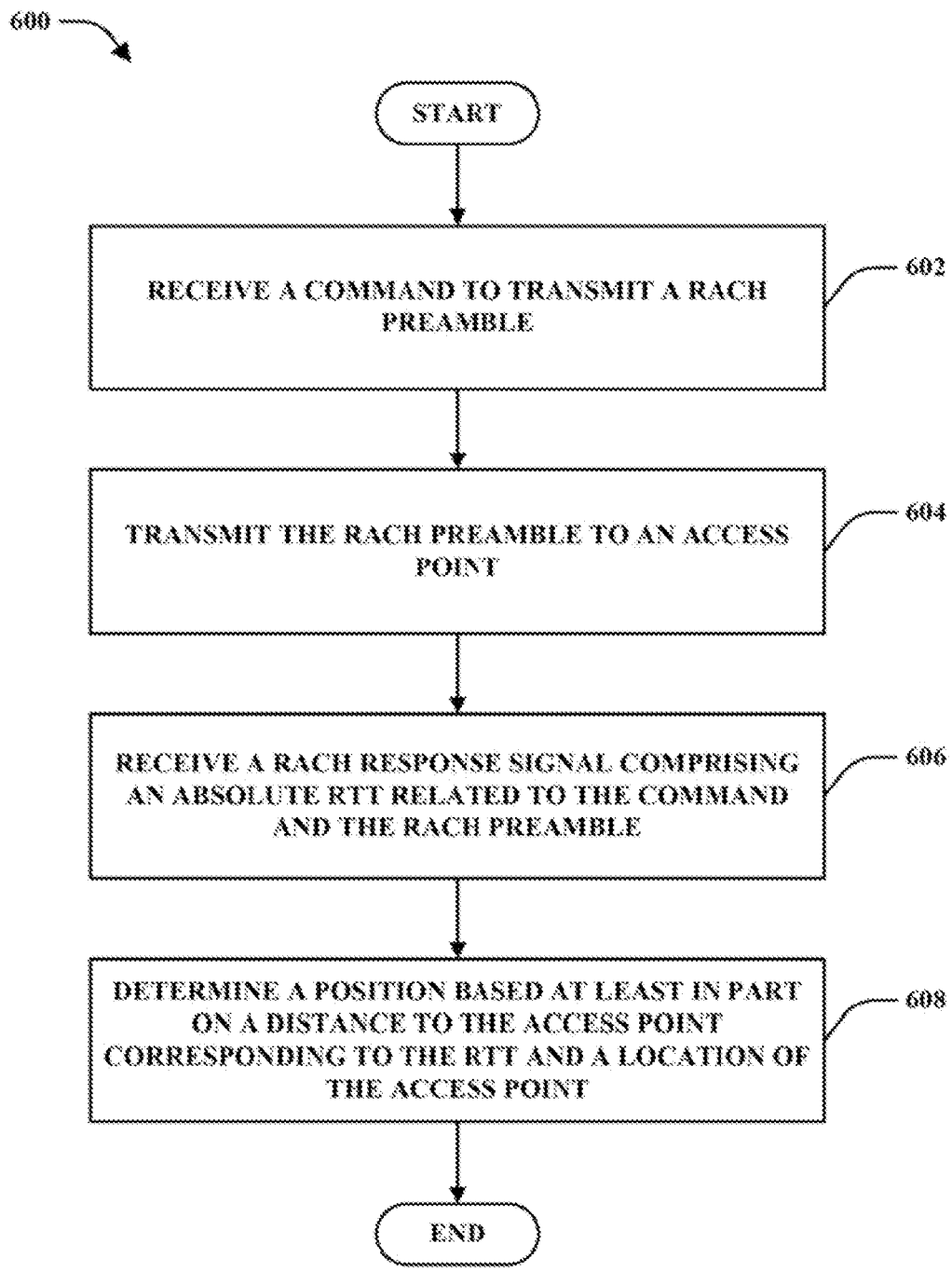
FIG. 6 is a flow diagram clan example methodology that determines a position based on receiving a RTT in a RACH procedure.

Referring to FIG. 6, an example methodology 600 that determines positioning based on parameters received in a RACH response signal is illustrated. At 602, a command to transmit a RACH preamble can be received from an access point. As described, this command can include a contention-free RACH preamble to transmit, in one example. At 604, the RACH preamble can be transmitted to the access point. At 606, a RACH response signal comprising an absolute RTT related to the command and the RACH preamble can be received. In this regard, for example, the RTT can relate to communicating with the access point. At 608, a position can be determined based at least in part on a distance to the access point corresponding to the RTT and a location of the access point. It is to be appreciated, as described, that the position can be determined based on additional similar distances and locations of other access points (e.g., using E-CID, triangulation, and/or the like).

Figure 7:
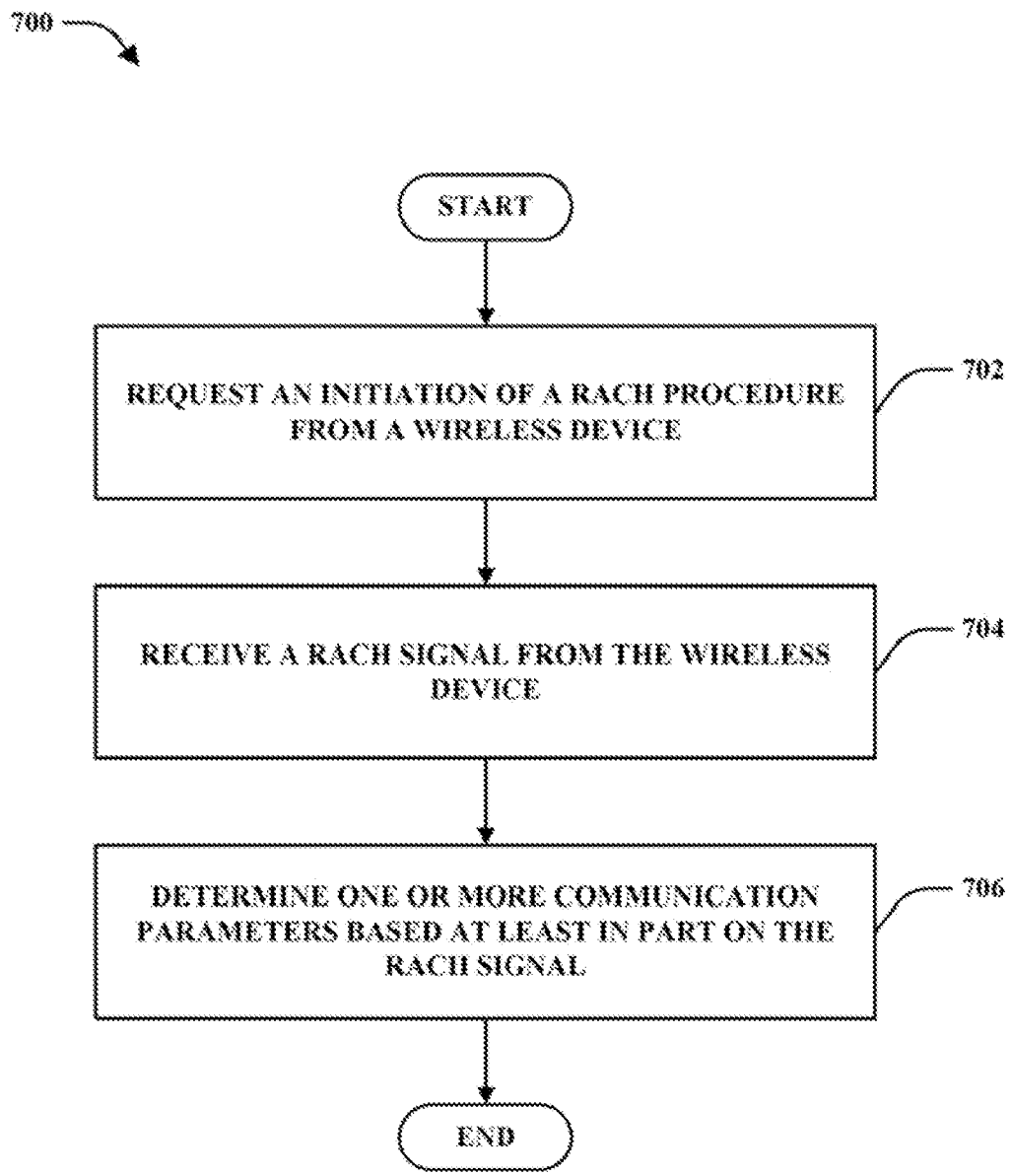
FIG. 7 is a flow diagram of an example methodology that commands a wireless device to initiate a RACH procedure.

Turning now to FIG. 7, an example methodology 700 is shown that facilitates commanding a wireless device to initiate a RACH procedure. At 702, an initiation of a RACH procedure can be requested from a wireless device. As described, for example, this can include providing a contention-free RACH preamble to the wireless device. At 704, a RACH signal can be received from the wireless device. Where the RACH preamble is provided, for example, the RACH signal can comprise the RACH preamble. At 706, one or more communication parameters can be determined based at least in part on the RACH signal. For example, as described, a RTT can be determined based at least in part on comparing a transmit time for the request for initiation of the RACH procedure with a receive time related to the RACH signal. In another example, a received signal power can be determined from the RACH signal.

Figure 8:
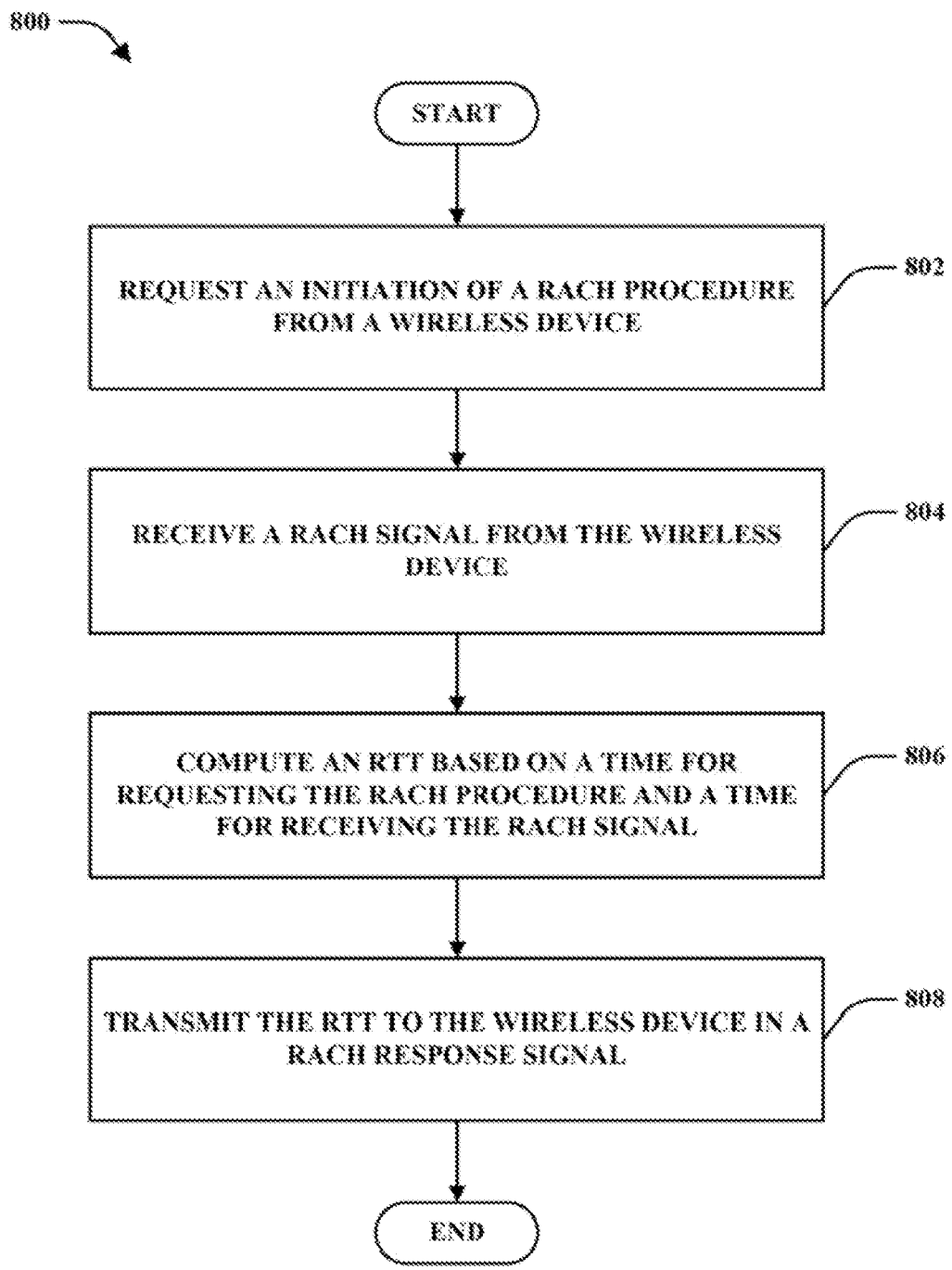
FIG. 8 is a flow diagram of an example methodology that provides a RTT to a wireless device in a RACH procedure.

Referring to FIG. 8, an example methodology 800 that computes an RTT related to communicating with a wireless device is illustrated. At 802, an initiation of a RACH procedure can be requested from a wireless device. As described, for example, this can include providing a contention-free RACH preamble to the wireless device. At 804, a RACH signal can be received from the wireless device. Where the RACH preamble is provided, for example, the RACH signal can comprise the RACH preamble. At 806, an RTT can be computed based on a time for requesting the RACH procedure and a time for receiving the RACH signal. For example, the difference in the times can indicate the RTT. At 808, the RTT can be transmitted to the wireless device in a RACH response signal. As described, the RTT can be subsequently utilized to compute a distance (e.g., for determining a position).

It will be appreciated that, in accordance with one or more aspects described herein, inferences can be made regarding computing communication parameters from a received RACH signal, utilizing the communication parameters to determine other communication information, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
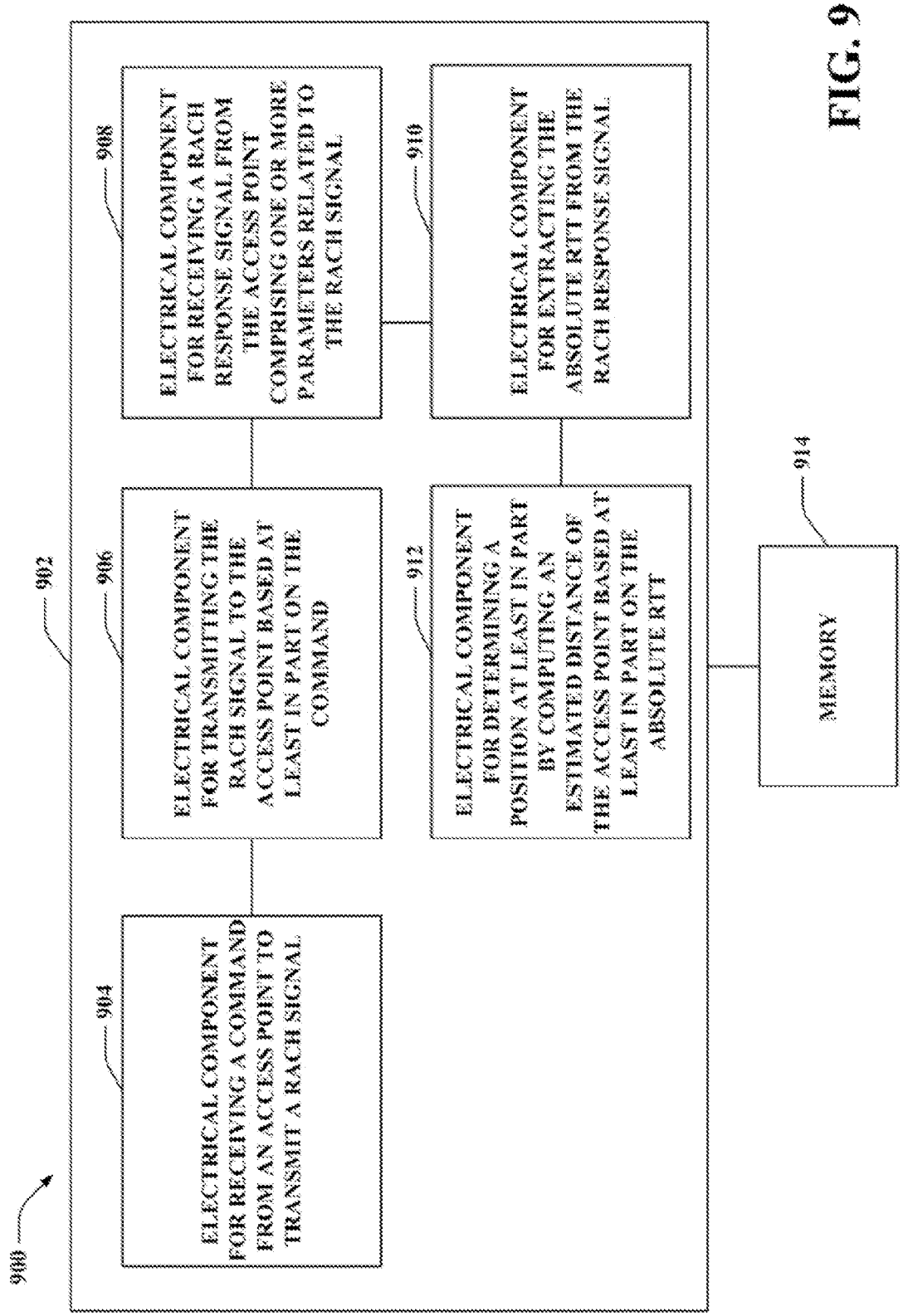
FIG. 9 is a block diagram of an example apparatus that initiates a RACH procedure based on a received request.

With reference to FIG. 9, illustrated is a system 900 that facilitates transmitting a RACH signal upon receiving a command or request for such. For example, system 900 can reside at least partially within a base station, mobile device, or another device that provides access to a wireless network. It is to be appreciated that system 900 is represented as including functional blocks, which can be functional blocks that represent functions implemented by a processor using instructions and/or data stored on a computer readable medium. System 900 includes a logical grouping 902 of electrical components that can act in conjunction. For instance, logical grouping 902 can include an electrical component for receiving a command from an access point to transmit a RACH signal 904. As described, in one example, the command can include a RACH preamble to transmit. Further, logical grouping 902 can comprise an electrical component for transmitting the RACH signal to the access point based at least in part on the command 906. As described, for example, where a RACH preamble is included in the command, the RACH signal can also include the RACH preamble.

Moreover, logical grouping 902 can include an electrical component for receiving a RACH response signal from the access point comprising one or more parameters related to the RACH signal 908. For example, the one or more parameters can include an RTT related to communicating with the access point, a received signal power related to the RACH signal at the access point, and/or the like. Further, logical grouping 902 includes an electrical component for extracting the absolute RTT from the RACH response signal 910. In addition, logical grouping 902 can include an electrical component for determining a position at least in part by computing an estimated distance of the access point based at least in part on the absolute RTT 912. As described, for example, electrical component 912 can determine the distance using E-CID, triangulation, and/or the like, using additional estimated distances related to disparate access points. Additionally, system 900 can include a memory 914 that retains instructions and/or data for executing functions associated with electrical components 904, 906, 908, 910, and 912. While shown as being external to memory 914, it is to be understood that one or more of electrical components 904, 906, 908, 910, and 912 can exist within memory 914.

Figure 10:
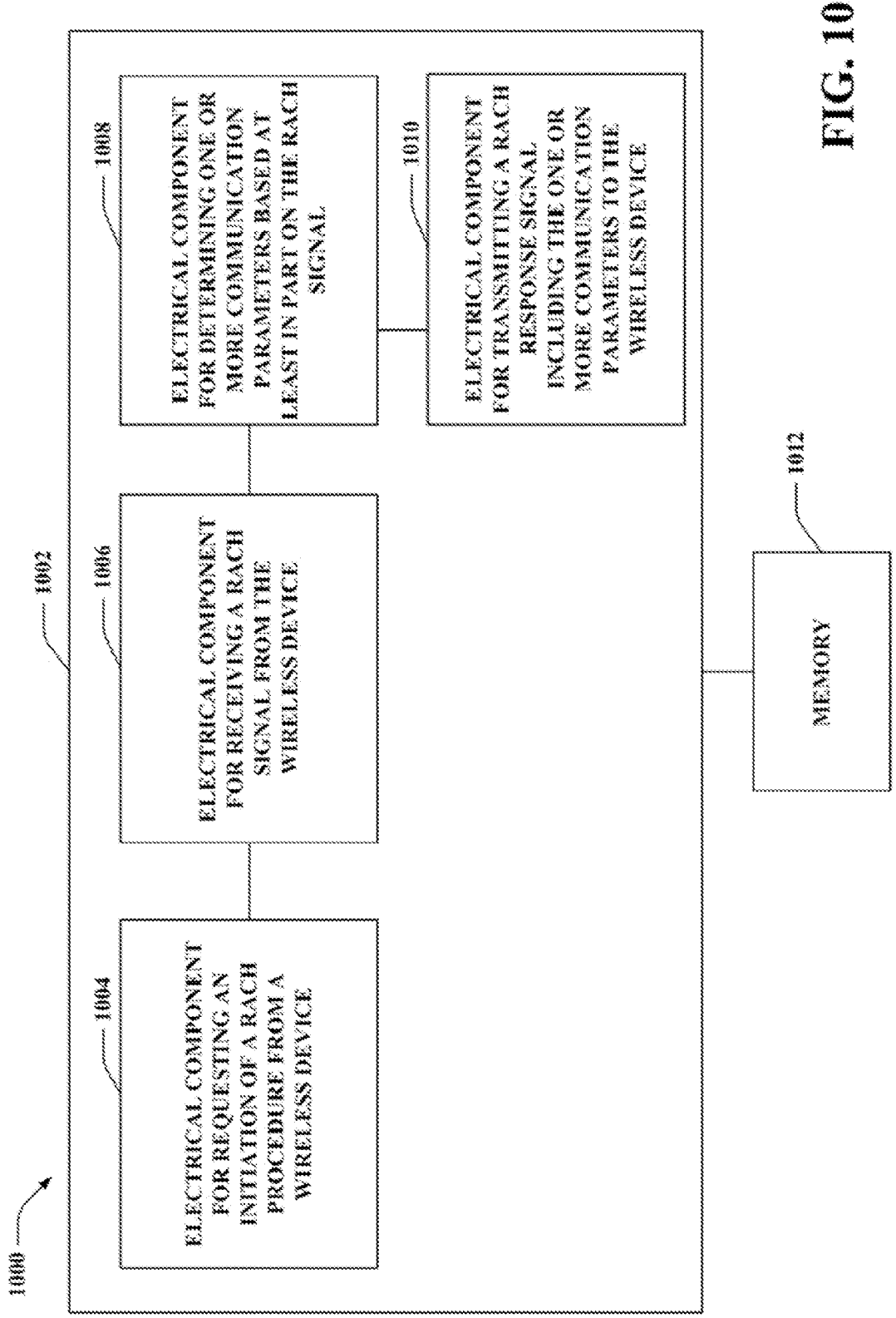
FIG. 10 is a block diagram of an example apparatus that requests RACH procedure initiation from a wireless device.

With reference to FIG. 10, illustrated is a system 1000 that requests a RACH procedure from a wireless device for determining communication parameters related thereto. For example, system 1000 can reside at least partially within a base station, mobile device, or another device that provides access to a wireless network. It is to be appreciated that system 1000 is represented as including functional blocks, which can be functional blocks that represent functions implemented by a processor using instructions and/or data stored on a computer readable medium. System 1000 includes a logical grouping 1002 of electrical components that can act in conjunction. For instance, logical grouping 1002 can include an electrical component for requesting an initiation of a RACH procedure from a wireless device 1004. As described, in an example, the request can include a RACH preamble for transmission by the wireless device. Further, logical grouping 1002 can comprise an electrical component for receiving a RACH signal from the wireless device 1006. As described, for example, the RACH signal can include the RACH preamble. Furthermore, logical grouping 1002 includes an electrical component for determining one or more communication parameters based at least in part on the RACH signal 1008. As described, for example, electrical component 1006 can determine an RTT based on a time of requesting initiation of the RACH procedure and a time of receiving the RACH signal, a received signal power of the RACH signal, etc. In addition, logical grouping 1002 includes an electrical component for transmitting a RACH response signal including the one or more communication parameters to the wireless device 1010. Additionally, system 1000 can include a memory 1012 that retains instructions and/or data for executing functions associated with electrical components 1004, 1006, 1008, and 1010. While shown as being external to memory 1012, it is to be understood that one or more of electrical components 1004, 1006, 1008, and 1010 can exist within memory 1012.

Figure 11:
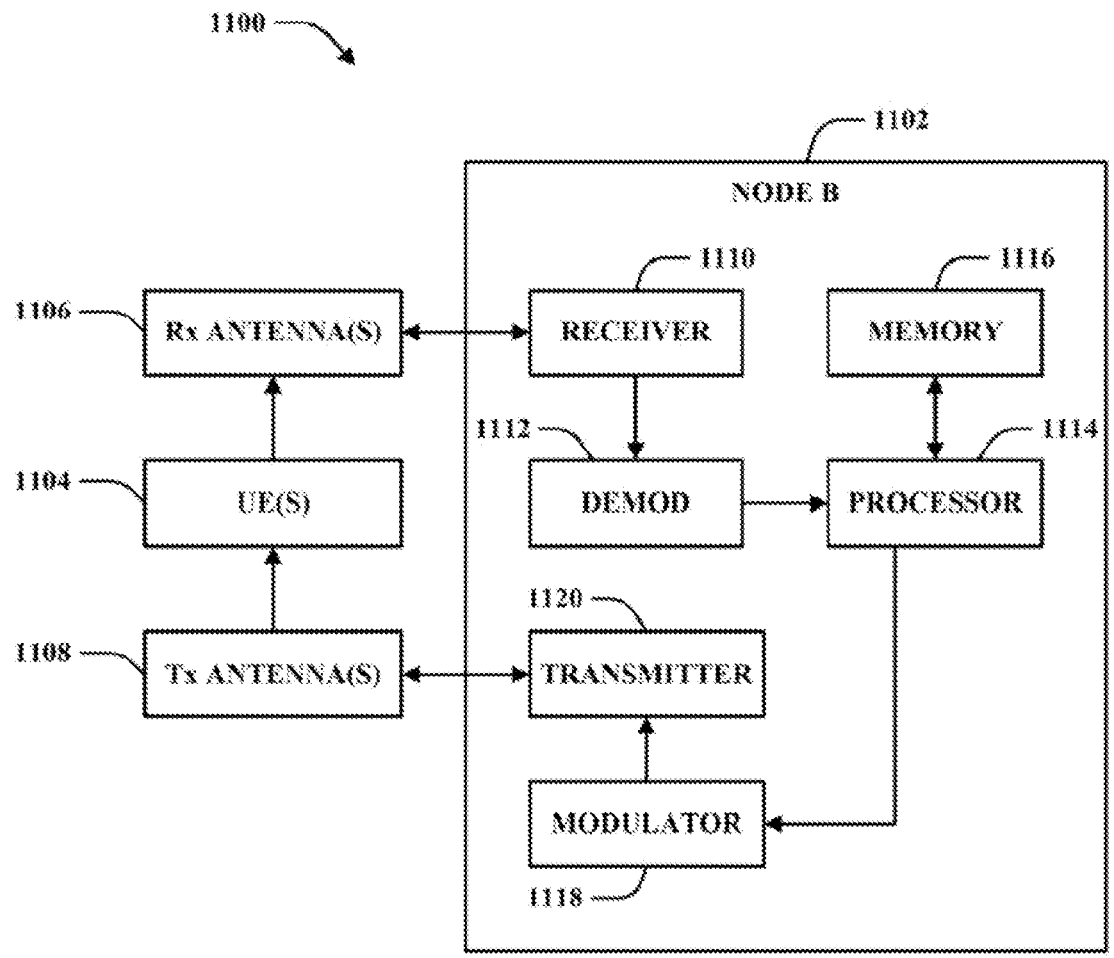
FIGS. 11-12 are block diagrams of example wireless communication devices that can be utilized to implement various aspects of the functionality described herein.

FIG. 11 is a block diagram of a system 1100 that can be utilized to implement various aspects of the functionality described herein. In one example, system 1100 includes a base station or Node B 1102. As illustrated, Node B 1102 can receive signal(s) from one or more UEs 1104 via one or more receive (Rx) antennas 1106 and transmit to the one or more UEs 1104 via one or more transmit (Tx) antennas 1108. Additionally, Node B 1102 can comprise a receiver 1110 that receives information from receive antenna(s) 1106. In one example, the receiver 1110 can be operatively associated with a demodulator (Demod) 1112 that demodulates received information. Demodulated symbols can then be analyzed by a processor 1114. Processor 1114 can be coupled to memory 1116, which can store information related to code clusters, access terminal assignments, lookup tables related thereto, unique scrambling sequences, and/or other suitable types of information. In one example, Node B 1102 can employ processor 1114 to perform methodologies 500, 600, 700, 800, and/or other similar and appropriate methodologies. Node B 1102 can also include a modulator 1118 that can multiplex a signal for transmission by a transmitter 1120 through transmit antenna(s) 1108.

Figure 12:
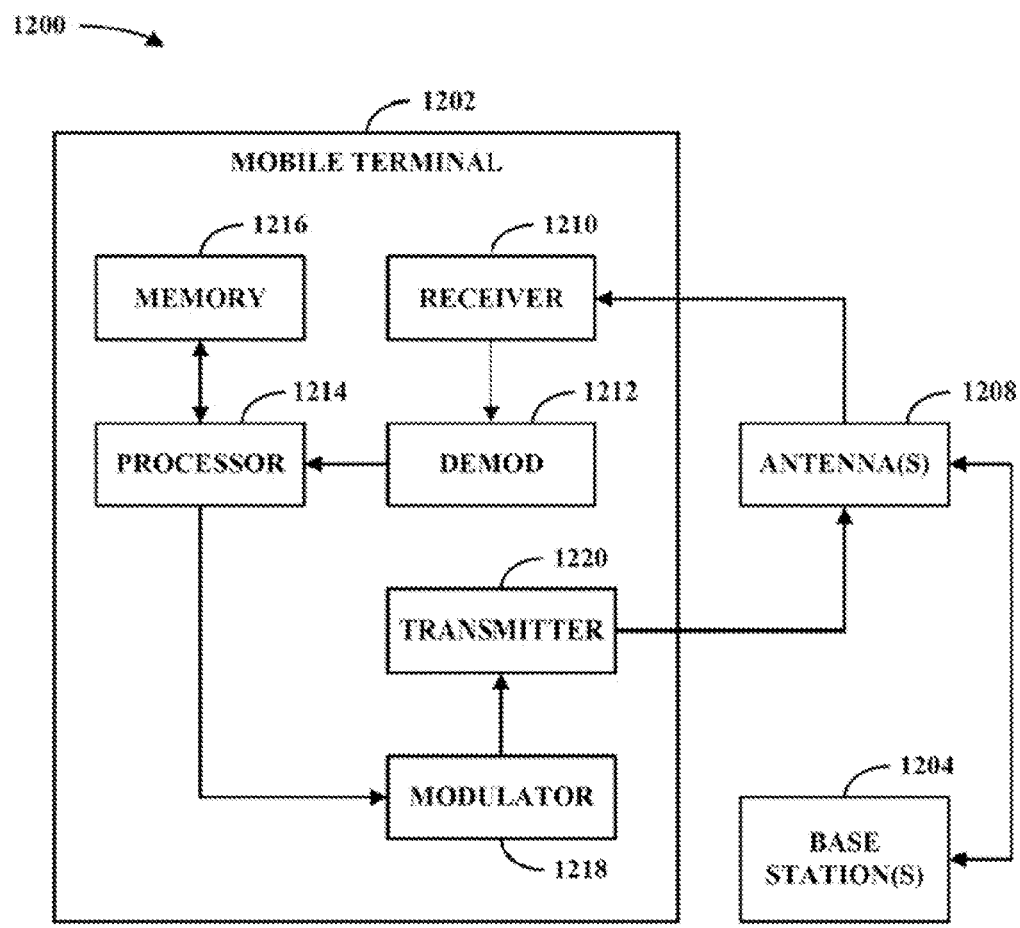

FIG. 12 is a block diagram of another system 1200 that can be utilized to implement various aspects of the functionality described herein. In one example, system 1200 includes a mobile terminal 1202. As illustrated, mobile terminal 1202 can receive signal(s) from one or more base stations 1204 and transmit to the one or more base stations 1204 via one or more antennas 1208. Additionally, mobile terminal 1202 can comprise a receiver 1210 that receives information from antenna(s) 1208. In one example, receiver 1210 can be operatively associated with a demodulator (Demod) 1212 that demodulates received information. Demodulated symbols can then be analyzed by a processor 1214. Processor 1214 can be coupled to memory 1216, which can store data and/or program codes related to mobile terminal 1202. Additionally, mobile terminal 1202 can employ processor 1214 to perform methodologies 500, 600, 700, 800, and/or other similar and appropriate methodologies. Mobile terminal 1202 can also employ one or more components described in previous figures to effectuate the described functionality; in one example, the components can be implemented by the processor 1214. Mobile terminal 1202 can also include a modulator 1218 that can multiplex a signal for transmission by a transmitter 1220 through antenna(s) 1208.

Figure 13:
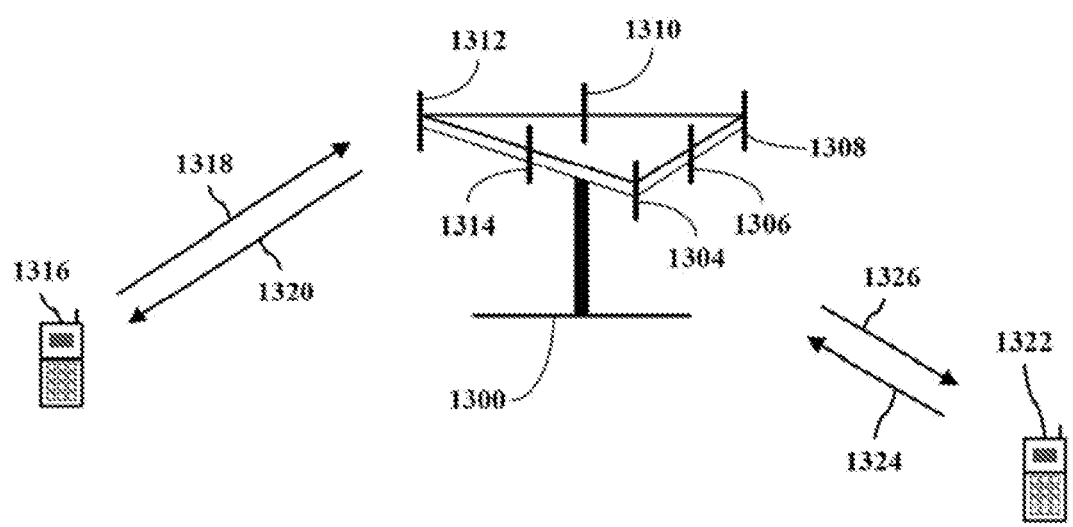
FIG. 13 illustrates an example wireless multiple-access communication system in accordance with various aspects set forth herein.

Referring now to FIG. 13, an illustration of a wireless multiple-access communication system is provided in accordance with various aspects. In one example, an access point 1300 (AP) includes multiple antenna groups. As illustrated in FIG. 13, one antenna group can include antennas 1304 and 1306, another can include antennas 1308 and 1310, and another can include antennas 1312 and 1314. While only two antennas are shown in FIG. 13 for each antenna group, it should be appreciated that more or fewer antennas may be utilized for each antenna group. In another example, an access terminal 1316 can be in communication with antennas 1312 and 1314, where antennas 1312 and 1314 transmit information to access terminal 1316 over forward link 1320 and receive information from access terminal 1316 over reverse link 1318. Additionally and/or alternatively, access terminal 1322 can be in communication with antennas 1306 and 1308, where antennas 1306 and 1308 transmit information to access terminal 1322 over forward link 1326 and receive information from access terminal 1322 over reverse link 1324. In a frequency division duplex system, communication links 1318, 1320, 1324 and 1326 can use different frequency for communication. For example, forward link 1320 may use a different frequency then that used by reverse link 1318.

Each group of antennas and/or the area in which they are designed to communicate can be referred to as a sector of the access point. In accordance with one aspect, antenna groups can be designed to communicate to access terminals in a sector of areas covered by access point 1300. In communication over forward links 1320 and 1326, the transmitting antennas of access point 1300 can utilize beamforming in order to improve the signal-to-noise ratio of forward links for the different access terminals 1316 and 1322. Also, an access point using beamforming to transmit to access terminals scattered randomly through its coverage causes less interference to access terminals in neighboring cells than an access point transmitting through a single antenna to all its access terminals.

An access point, e.g., access point 1300, can be a fixed station used for communicating with terminals and can also be referred to as a base station, a Node B, an access network, and/or other suitable terminology. In addition, an access terminal, e.g., an access terminal 1316 or 1322, can also be referred to as a mobile terminal, user equipment, a wireless communication device, a terminal, a wireless terminal, and/or other appropriate terminology.

Figure 14:
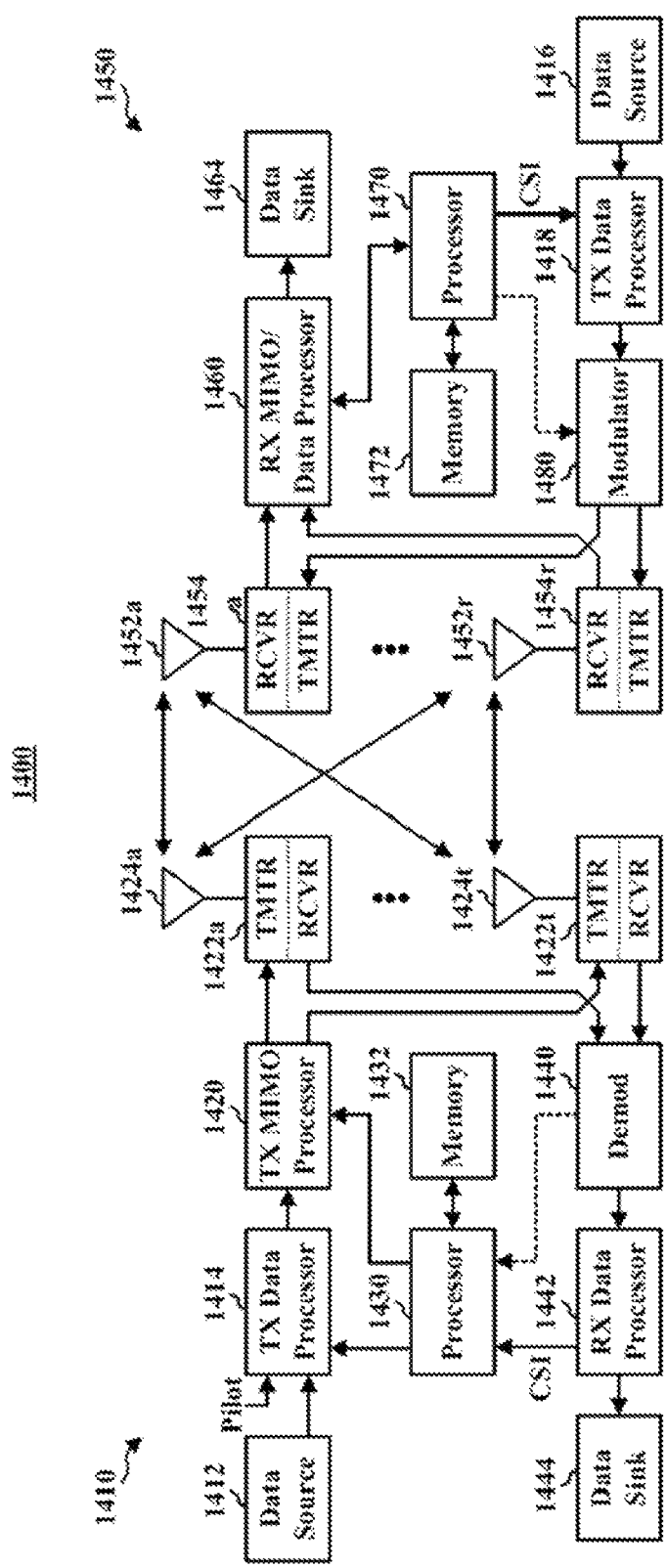
FIG. 14 is a block diagram illustrating an example wireless communication system in which various aspects described herein can function.

Referring now to FIG. 14, a block diagram illustrating an example wireless communication system 1400 in which various aspects described herein can function is provided. In one example, system 1400 is a multiple-input multiple-output (MIMO) system that includes a transmitter system 1410 and a receiver system 1450. It should be appreciated, however, that transmitter system 1410 and/or receiver system 1450 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1410 and/or receiver system 1450 described herein could be utilized in connection with a single output to single input antenna system.

In accordance with one aspect, traffic data for a number of data streams are provided at transmitter system 1410 from a data source 1412 to a transmit (TX) data processor 1414. In one example, each data stream can then be transmitted via a respective transmit antenna 1424. Additionally, TX data processor 1414 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1450 to estimate channel response. Back at transmitter system 1410, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1430.

Next, modulation symbols for all data streams can be provided to a TX MIMO processor 1420, which can further process the modulation symbols (e.g., for OFDM). TX MIMO processor 1420 can then provides $N_T$ modulation symbol streams to $N_T$ transceivers 1422a through 1422t. In one example, each transceiver 1422 can receive and process a respective symbol stream to provide one or more analog signals. Each transceiver 1422 can then further condition (e.g., amplify, filter, and up-convert) the analog signals to provide a modulated signal suitable for transmission over a MIMO channel. Accordingly, $N_T$ modulated signals from transceivers 1422a through 1422t can then be transmitted from $N_T$ antennas 1424a through 1424t, respectively.

In accordance with another aspect, the transmitted modulated signals can be received at receiver system 1450 by $N_R$ antennas 1452a through 1452r. The received signal from each antenna 1452 can then be provided to respective transceivers 1454. In one example, each transceiver 1454 can condition (e.g., filter, amplify, and down-convert) a respective received signal, digitize the conditioned signal to provide samples, and then processes the samples to provide a corresponding "received" symbol stream. An RX MIMO/data processor 1460 can then receive and process the $N_R$ received symbol streams from $N_R$ transceivers 1454 based on a particular receiver processing technique to provide $N_T$ "detected" symbol streams. In one example, each detected symbol stream can include symbols that are estimates of the modulation symbols transmitted for the corresponding data stream. RX MIMO/data processor 1460 can then process each symbol stream at least in part by demodulating, deinterleaving, and decoding each detected symbol stream to recover traffic data for a corresponding data stream. Thus, the processing by RX MIMO/data processor 1460 can be complementary to that performed by TX MIMO processor 1420 and TX data processor 1418 at transmitter system 1410. RX MIMO/data processor 1460 can additionally provide processed symbol streams to a data sink 1464.

In accordance with one aspect, the channel response estimate generated by RX MIMO/data processor 1460 can be used to perform space/time processing at the receiver, adjust power levels, change modulation rates or schemes, and/or other appropriate actions. Additionally, RX MIMO/data processor 1460 can further estimate channel characteristics such as, for example, signal-to-noise-and-interference ratios (SNRs) of the detected symbol streams. RX MIMO/data processor 1460 can then provide estimated channel characteristics to a processor 1470. In one example, RX MIMO/data processor 1460 and/or processor 1470 can further derive an estimate of the "operating" SNR for the system. Processor 1470 can then provide channel state information (CSI), which can comprise information regarding the communication link and/or the received data stream. This information can include, for example, the operating SNR. The CSI can then be processed by a TX data processor 1418, modulated by a modulator 1480, conditioned by transceivers 1454a through 1454r, and transmitted back to transmitter system 1410. In addition, a data source 1416 at receiver system 1450 can provide additional data to be processed by TX data processor 1418.

Back at transmitter system 1410, the modulated signals from receiver system 1450 can then be received by antennas 1424, conditioned by transceivers 1422, demodulated by a demodulator 1440, and processed by a RX data processor 1442 to recover the CSI reported by receiver system 1450. In one example, the reported CSI can then be provided to processor 1430 and used to determine data rates as well as coding and modulation schemes to be used for one or more data streams. The determined coding and modulation schemes can then be provided to transceivers 1422 for quantization and/or use in later transmissions to receiver system 1450. Additionally and/or alternatively, the reported CSI can be used by processor 1430 to generate various controls for TX data processor 1414 and TX MIMO processor 1420. In another example, CSI and/or other information processed by RX data processor 1442 can be provided to a data sink 1444.

In one example, processor 1430 at transmitter system 1410 and processor 1470 at receiver system 1450 direct operation at their respective systems. Additionally, memory 1432 at transmitter system 1410 and memory 1472 at receiver system 1450 can provide storage for program codes and data used by processors 1430 and 1470, respectively. Further, at receiver system 1450, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method of wireless communication, comprising:
   receiving, after establishing a connection with an access point based at least in part on a first random access channel (RACH) procedure, a request from the access point to start a second RACH procedure;
   transmitting a RACH preamble to the access point based at least in part on the request; and
   receiving a RACH response signal from a disparate access point comprising one or more parameters related to the RACH preamble.

2. The method of claim 1, further comprising receiving a RACH response signal from the access point comprising one or more parameters related to the RACH preamble.

3. The method of claim 2, wherein the one or more parameters comprise an absolute round trip time (RTT) related to a transmission time of the request and a receive time of the RACH preamble.

4. The method of claim 3, further comprising:
estimating a distance of the access point based at least in part on the absolute RTT; and
determining a position based at least in part on the distance and one or more reference coordinates related to a location of the access point.

5. The method of claim 2, wherein the one or more parameters comprise a received signal power related to the RACH preamble.

6. The method of claim 5, further comprising computing a path loss related to the access point based at least in part on the received signal power related to the RACH signal and a signal power utilized to transmit the RACH signal to the access point.

7. The method of claim 1, wherein receiving the request includes receiving a contention-free RACH preamble from the access point, and transmitting the RACH preamble includes transmitting the contention-free RACH preamble to the access point.

8. A wireless communications apparatus, comprising:
at least one processor configured to:
obtain, after establishing a connection with an access point based at least in part on a first random access channel (RACH) procedure, a request from the access point to start a second RACH procedure;
communicate a RACH preamble to the access point based at least in part on the request; and
receive a RACH response signal from a disparate access point comprising one or more parameters related to the RACH preamble; and
a memory coupled to the at least one processor.

9. The wireless communications apparatus of claim 8, wherein the at least one processor is further configured to obtain a RACH response signal from the access point comprising one or more parameters related to the RACH preamble.

10. The wireless communications apparatus of claim 9, wherein the one or more parameters comprise an absolute round trip time (RTT) related to a transmission time of the request and a receive time of the RACH preamble.

11. The wireless communications apparatus of claim 10, wherein the at least one processor is further configured to:
compute a distance of the access point based at least in part on the absolute RTT; and
determine a position of the wireless communications apparatus based at least in part on the distance and one or more reference coordinates related to a location of the access point.

12. The wireless communications apparatus of claim 8, wherein the request includes a contention-free RACH preamble, and the at least one processor is further configured to generate the RACH preamble based at least in part on the contention-free RACH preamble.

13. A wireless communications apparatus, comprising:
means for receiving, after establishing a connection with an access point based at least in part on a first random access channel (RACH) procedure, a request from the access point to start a second RACH procedure;
means for transmitting a RACH preamble to the access point based at least in part on the request; and
means for receiving a RACH response signal from a disparate access point comprising one or more parameters related to the RACH preamble.

14. The wireless communications apparatus of claim 13, further comprising means for receiving a RACH response signal from the access point comprising one or more parameters related to the RACH preamble.

15. The wireless communications apparatus of claim 14, wherein the one or more parameters comprise an absolute round trip time (RTT) related to a transmission time of the request and a receive time of the RACH preamble.

16. The wireless communications apparatus of claim 15, further comprising:
means for extracting the absolute RTT from the RACH response signal; and
means for determining a position of the wireless communications apparatus at least in part by computing an estimated distance of the access point based at least in part on the absolute RTT.

17. The wireless communications apparatus of claim 13, wherein the request includes a contention-free RACH preamble, and the RACH preamble comprises the contention-free RACH preamble.

18. A non-transitory computer-readable medium comprising:
code for causing at least one computer to obtain, after establishing a connection with an access point based at least in part on a first random access channel (RACH) procedure, a request from the access point to start a second RACH procedure;
code for causing the at least one computer to communicate a RACH preamble to the access point based at least in part on the request; and
code for causing the at least one computer to receive a RACH response signal from a disparate access point comprising one or more parameters related to the RACH preamble.

19. The non-transitory computer-readable medium of claim 18, further comprising code for causing the at least one computer to obtain a RACH response signal from the access point comprising one or more parameters related to the RACH preamble.

20. The non-transitory computer-readable medium of claim 19, wherein the one or more parameters comprise an absolute round trip time (RTT) related to a transmission time of the request and a receive time of the RACH preamble.

21. The non-transitory computer-readable medium of claim 20, further comprising:
code for causing the at least one computer to compute a distance of the access point based at least in part on the absolute RTT; and
code for causing the at least one computer to determine a position based at least in part on the distance and one or more reference coordinates related to a location of the access point.

22. The non-transitory computer-readable medium of claim 18, wherein the request includes a contention-free RACH preamble, and the non-transitory computer-readable medium further comprises code for causing the at least one computer to generate the RACH preamble based at least in part on the contention-free RACH preamble.

23. A wireless communications apparatus, comprising:
a random access channel (RACH) request receiving component that obtains, after establishing a connection with an access point based at least in part on a first RACH procedure, a request from the access point to start a second RACH procedure;
a RACH initiating component that transmits a RACH preamble to the access point based at least in part on the request to initiate the second RACH procedure; and a RACH response receiving component that receives a RACH response signal from a disparate access point comprising one or more parameters related to the RACH preamble.

24. The wireless communications apparatus of claim 23, further comprising a RACH response receiving component that obtains a RACH response signal from the access point comprising one or more parameters related to the RACH preamble.

25. The wireless communications apparatus of claim 24, wherein the one or more parameters comprise an absolute round trip time (RTT) related to a transmission time of the request and a receive time of the RACH preamble.

26. The wireless communications apparatus of claim 25, further comprising:
an RTT determining component that extracts the absolute RTT from the RACH response signal; and
a position determining component that computes a position of the wireless communications apparatus at least in part by computing an estimated distance of the access point based at least in part on the absolute RTT.

27. The wireless communications apparatus of claim 23, wherein the request includes a contention-free RACH preamble, and the RACH preamble comprises the contention-free RACH preamble.

28. A method of wireless communication, comprising:
transmitting, after establishing a connection with a wireless device based at least in part on a first random access channel (RACH) procedure, a request to the wireless device to start a second RACH procedure;
receiving a RACH preamble from the wireless device based at least in part on the request;
determining one or more communication parameters based at least in part on the RACH preamble; and
communicating a RACH response signal or the one or more communication parameters to a disparate access point for transmitting to the wireless device.

29. The method of claim 28, further comprising transmitting a RACH response signal including the one or more communication parameters to the wireless device.

30. The method of claim 29, wherein determining the one or more communication parameters includes determining an absolute round trip time (RTT) based at least in part on a transmission time related to the request and a receive time related to the RACH preamble.

31. The method of claim 29, wherein determining the one or more communication parameters includes determining a received signal power of the RACH preamble.

32. The method of claim 28, wherein transmitting the request includes requesting transmission of a specific contention-free RACH preamble, and the RACH preamble includes the specific contention-free RACH preamble.

33. A wireless communications apparatus, comprising:
at least one processor configured to:
communicate, after establishing a connection with a wireless device based at least in part on a first random access channel (RACH) procedure, a request to the wireless device to start a second RACH procedure;
obtain a RACH preamble from the wireless device based at least in part on the request;
compute one or more communication parameters based at least in part on the RACH preamble; and
communicate a RACH response signal or the one or more communication parameters to a disparate access point for transmitting to the wireless device; and
a memory coupled to the at least one processor.

34. The wireless communications apparatus of claim 33, wherein the at least one processor is further configured to transmit the one or more communication parameters to the wireless device in a RACH response preamble.

35. The wireless communications apparatus of claim 34, wherein the at least one processor is further configured to determine an absolute round trip time (RTT) based at least in part on a transmission time related to communicating the request and a receive time related to the RACH preamble, and the one or more communication parameters comprises the RTT.

36. The wireless communications apparatus of claim 33, wherein the request to initiate the second RACH procedure includes a contention-free RACH preamble, and the RACH preamble includes the contention-free RACH preamble.

37. A wireless communications apparatus, comprising:
means for transmitting, after establishing a connection with a wireless device based at least in part on a first random access channel (RACH) procedure, a request to the wireless device to start a second RACH procedure;
means for receiving a RACH preamble from the wireless device based at least in part on the request;
means for determining one or more communication parameters based at least in part on the RACH preamble; and
means for communicating a RACH response signal or the one or more communication parameters to a disparate access point for transmitting to the wireless device.

38. The wireless communications apparatus of claim 37, further comprising means for transmitting a RACH response signal including the one or more communication parameters to the wireless device.

39. The wireless communications apparatus of claim 38, wherein the one or more communication parameters include an absolute round trip time (RTT) computed based at least in part on a transmission time related to the request and a receive time related to the RACH preamble.

40. A non-transitory computer-readable medium comprising:
code for causing at least one computer to communicate, after establishing a connection with a wireless device based at least in part on a first random access channel (RACH) procedure, a request to the wireless device to start a second RACH procedure;
code for causing the at least one computer to obtain a RACH preamble from the wireless device based at least in part on the request;
code for causing the at least one computer to compute one or more communication parameters based at least in part on the RACH preamble; and
code for causing the at least one computer to communicate a RACH response signal or the one or more communication parameters to a disparate access point for transmitting to the wireless device.

41. The non-transitory computer-readable medium of claim 40, further comprising code for causing the at least one computer to transmit the one or more communication parameters to the wireless device in a RACH response signal.

42. The non-transitory computer-readable medium of claim 41, further comprising code for causing the at least one computer to determine an absolute round trip time (RTT) based at least in part on a transmission time related to communicating the request and a receive time related to the RACH preamble, and the one or more communication parameters comprises the RTT.

43. The non-transitory computer-readable medium of claim 40, wherein the request to initiate the second RACH procedure includes a contention-free RACH preamble, and the RACH preamble includes the contention-free RACH preamble.

44. A wireless communications apparatus, comprising:
- a random access channel (RACH) requesting component that, after establishing a connection with a wireless device based at least in part on a first RACH procedure, transmits a request to the wireless device to start a second RACH procedure;
- a RACH preamble receiving component that obtains a RACH preamble from the wireless device based at least in part on the request;
- a parameter generating component that computes one or more communication parameters based at least in part on the RACH preamble; and
- a RACH responding component that communicates a RACH response signal or the one or more communication parameters to a disparate access point for transmitting to the wireless device.

45. The wireless communications apparatus of claim 44, further comprising a RACH responding component that transmits a RACH response signal including the one or more communication parameters to the wireless device.

46. The wireless communications apparatus of claim 45, wherein the one or more communication parameters include an absolute round trip time (RTT) computed based at least in part on a transmission time related to the RACH requesting component transmitting the request to the wireless device and a receive time related to the RACH preamble receiving component obtaining the RACH preamble.

* * * * *